United States Patent [19]

Sutton

[11] Patent Number: 5,644,591
[45] Date of Patent: Jul. 1, 1997

[54] METHOD AND APPARATUS FOR PERFORMING SEARCH ACQUISITION IN A CDMA COMMUNICATIONS SYSTEM

[75] Inventor: Todd R. Sutton, San Diego, Calif.

[73] Assignee: Qualcomm Incorporated, San Diego, Calif.

[21] Appl. No.: 643,226

[22] Filed: May 2, 1996

Related U.S. Application Data

[63] Continuation of Ser. No. 283,304, Jul. 29, 1994, abandoned.

[51] Int. Cl.$^6$ .............. H04B 15/00; H04K 1/00; H04L 27/30
[52] U.S. Cl. .............. 375/200; 375/206; 375/354; 370/342
[58] Field of Search .............. 380/34, 48; 455/63, 455/65, 67.1, 67.4; 375/200–210, 229, 230, 231, 232, 354, 365, 367

[56] References Cited

U.S. PATENT DOCUMENTS

| | | | |
|---|---|---|---|
| 3,715,508 | 2/1973 | Blasbalg | 370/19 |
| 4,052,565 | 10/1977 | Baxter et al. | 380/28 |
| 4,301,530 | 11/1981 | Gutleber | 370/18 |
| 4,460,992 | 7/1984 | Gutleber | 370/19 |
| 4,472,815 | 9/1984 | Gutleber | 375/34 |
| 4,635,221 | 1/1987 | Kerr | 364/821 |
| 4,730,340 | 3/1988 | Frazier, Jr. | 375/207 |
| 4,872,200 | 10/1989 | Jansen | 380/34 |
| 4,901,307 | 2/1990 | Gilhousen et al. | 370/18 |
| 4,933,952 | 6/1990 | Albrieux et al. | 375/200 |
| 4,939,745 | 7/1990 | Kirimoto et al. | 375/200 |
| 5,101,501 | 3/1992 | Gilhousen et al. | 455/33.2 |
| 5,103,459 | 4/1992 | Gilhousen et al. | 375/205 |
| 5,177,765 | 1/1993 | Holland et al. | 375/1 |
| 5,363,401 | 11/1994 | Lucas et al. | 375/1 |

FOREIGN PATENT DOCUMENTS 9200639  1/1992  WIPO .

OTHER PUBLICATIONS

Orthogonal Sets of Functions, Advanced Engineering Mathematics, Erwin Kreyszig, Section 4.7; (1979; John Wiley & Sons).

Nonlinear Estimation of PSK–Modulated Carrier Phase with Application to Burst Digital Transmission, Andrew J. Viterbi, et al., IEEE Transactions on Information Theory, vol. IT–29, No. 4, pp. 543–551, Jul. 1983.

*Primary Examiner*—Stephen Chin
*Assistant Examiner*—Hai H. Phan
*Attorney, Agent, or Firm*—Russell B. Miller; Sean English

[57] ABSTRACT

A novel an improved method of acquisition in a spread spectrum communication system is presented. In the present invention, a large window of PN chip offset hypotheses are searched and if an energy signal is found that might indicate the presence of the pilot signal having one of the chip offsets of the large search window, then a search of a subset of offset hypotheses, or small window, is searched.

27 Claims, 4 Drawing Sheets

METHOD AND APPARATUS FOR PERFORMING SEARCH ACQUISITION IN A CDMA COMMUNICATIONS SYSTEM

This is a continuation of application Ser. No. 08/283,304, filed Jul. 29, 1994, now abandoned.

BACKGROUND OF THE INVENTION

I. Field of the Invention

The present invention relates to spread spectrum communications. More particularly, the present invention relates to a novel and improved method and apparatus for acquisition in spread spectrum communication environment.

II. Description of the Related Art

The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention, of which the disclosure thereof is incorporated by reference herein.

CDMA by its inherent nature of being a wideband signal offers a form of frequency diversity by spreading the signal energy over a wide bandwidth. Therefore, frequency selective fading affects only a small part of the CDMA signal bandwidth.

Space or path diversity is obtained by providing multiple signal paths through simultaneous links from a mobile user through two or more cell-sites. Furthermore, path diversity may be obtained by exploiting the multipath environment through spread spectrum processing by allowing a signal arriving with different propagation delays to be received and processed separately. Examples of the vitilization of path diversity are illustrated in U.S. Pat. No. 5,101,501, issued Mar. 31, 1992, entitled "SOFT HANDOFF IN A CDMA CELLULAR TELEPHONE SYSTEM", and U.S. Pat. No. 5,109,390, issued Apr. 28, 1992, entitled "DIVERSITY RECEIVER IN A CDMA CELLULAR TELEPHONE SYSTEM", both assigned to the assignee of the present invention and incorporated by reference herein.

The deleterious effects of fading can be further controlled to a certain extent in a CDMA system by controlling transmitter power. A system for cell-site and mobile unit power control is disclosed in U.S. Pat. No. 5,056,109, issued Oct. 8, 1991, entitled "METHOD AND APPARATUS FOR CONTROLLING TRANSMISSION POWER IN A CDMA CELLULAR MOBILE TELEPHONE SYSTEM", Ser. No. 07/433,031, filed Nov. 7, 1989, also assigned to the assignee of the present invention. The use of CDMA techniques in a multiple access communication system is further disclosed in U.S. Pat. No. 5,103,459, issued Apr. 7, 1992, entitled "SYSTEM AND METHOD FOR GENERATING SIGNAL WAVEFORMS IN A CDMA CELLULAR TELEPHONE SYSTEM", assigned to the assignee of the present invention, of which the disclosure thereof is incorporated by reference herein.

The aforementioned patents all describe the use of a pilot signal used for acquisition. The use of a pilot signal enables the mobile station to acquire local base station communication system in a timely manner. The mobile station gets synchronization information and relative signal power information from the received pilot signal.

In an ideal system where the hardware set up time is zero, a search window of one hypothesis would be ideal. However, because it takes time to set up the hardware to conduct searches, windows of hypotheses are tested. The longer the time required to set up the hardware, the larger the necessary window size. In complex systems a searcher is required to search a window of many hypotheses and upon finding a candidate synchronized sequence, will repeat the search over the window a predetermined number of times to verify the synchronization. This process requires an unacceptably long acquisition time. The present invention provides a method and apparatus for accelerating the time required to acquire a pilot signal in a mobile communications system.

SUMMARY OF THE INVENTION

The present invention is a novel and improved method and apparatus that reduces the mobile trait forward link acquisition time. It is an advantage of the present invention to minimize the total time for acquisition by speeding up the search methodology without incurring excessive penalties for false acquisition.

A method for determining and verifying the phase of a pilot channel in a spread spectrum communication system is disclosed comprising the steps of determining a set of calculated energy values for a first predetermined large window set of PN sequence hypotheses; comparing the set of calculated energy values against a first threshold value; determining a second set of calculated energy values for a predetermined small window set of PN sequence hypotheses wherein the small window PN sequence hypotheses are a subset of the large window set of PN sequence hypotheses when at least one energy value of the set of calculated energy values exceeds the first threshold value; and determining the phase of the pilot channel in accordance with the second set of calculated energy values.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

In a spread spectrum communication system, a pilot signal is used to synchronize a mobile station in phase and frequency to the transmissions of a base station. In the exemplary embodiment, the spread spectrum communication system is a direct-sequence spread spectrum communication system. Examples of such systems are discussed in U.S. Pat. No. 5,056,109 and U.S. Pat. No. 5,103,459. In a direct-sequence spread spectrum communication system, the transmitted signals are spread over a frequency band greater than the minimum bandwidth necessary to transmit the information by modulating a carrier wave by the data signal, then modulating the resulting signal again with a wideband spreading signal. In a pilot signal, the data can be looked at as an all ones sequence.

The spreading signal is typically generated by a linear feedback shift register, the implementation of which is described in detail in the aforementioned patents. The spreading signal can be viewed as a rotating phasor of the form:

$$s(t) = A e^{-\omega t + \phi} \tag{1}$$

In order to acquire, the mobile station must synchronize to the received signals from the base station in both phase, $\phi$, and in frequency, $\omega$. The object of the searcher operation is to find the phase of the received signal, $\phi$. After finding the phase of the spreading signal, $\phi$, the frequency is found in using a demodulation element that has hardware for both phase and frequency tracking. The method by which a mobile finds the phase of the received signal is by testing a set of phase hypotheses, referred to as a window and determining if one of the hypothetical phase hypotheses, also referred to as offset hypotheses, is correct.

Figure 1:
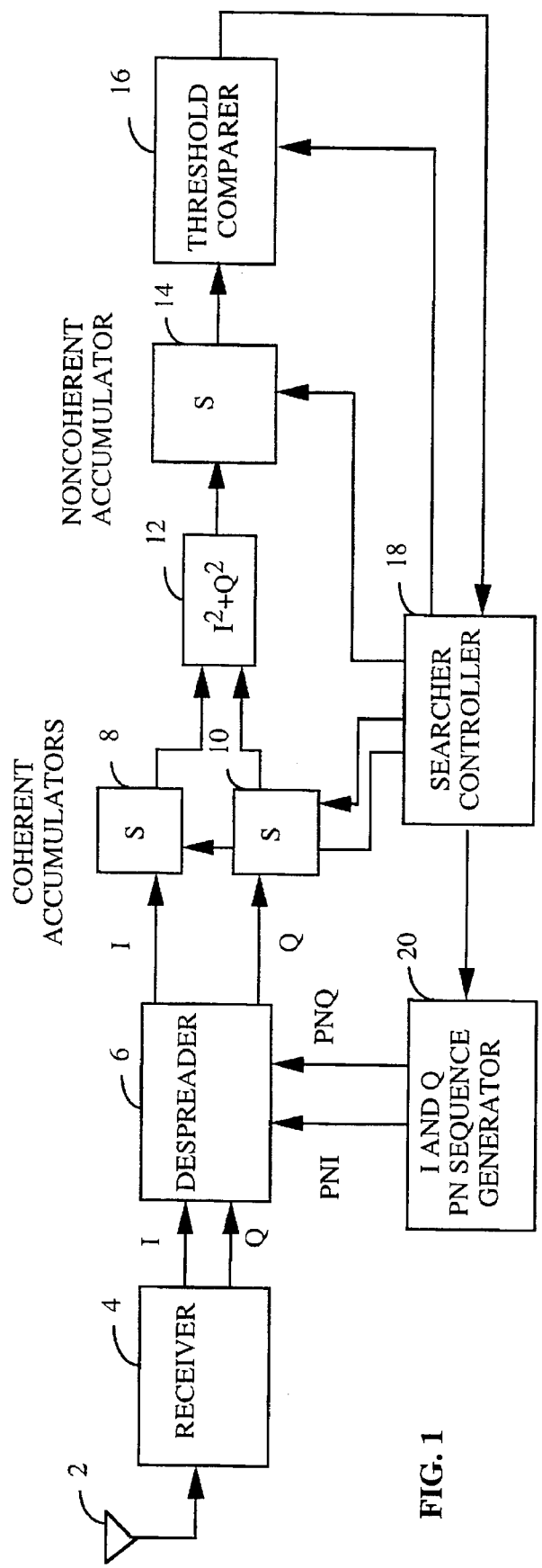
FIG. 1 is a block diagram of the present invention.

Turning now to the drawings, FIG. 1 illustrates the apparatus of the present invention. Upon power up, a spread spectrum signal is received at antenna 2. The objective of the apparatus is to gain synchronization between pseudorandom noise (PN) sequences generated by PN sequence generator 20 and the received spread spectrum signal which is spread by identical PN sequences of unknown phase.

In the exemplary embodiment, both the modulator that spreads the pilot signal and PN generator 20 are a maximal length shift register which generate the PN code sequences for spreading and despreading the pilot signal respectively. Thus, the operation of obtaining synchronization between the codes used to despread the received pilot signal and the PN spreading code of the received pilot signal involves determining the time offset of the shift register.

The spread spectrum signal is provided by antenna 2 to receiver 4. Receiver 4 downconverts the signal and provides the signal to despreading element 6. Despreading element 6 multiplies the received signal by the PN code generated by PN generator 20. Due to the random noise like nature of the PN codes the product of the PN code and the received signal should be essentially zero except at the point of synchronization.

However, due to a lack of synchronization on a chip level and due to introduced noise, this is not the case and gives rise to false alarm situations where the mobile station may believe that it has successfully acquired the pilot signal but in realty it has not. In order to give higher certainty to the determined condition of successful lock, the test is repeated a number of times. The number of times the test is repeated is determined by searcher controller 18. Searcher controller 18 may be implemented in hardware using a microprocessor or micro-controller or alternatively in software.

Searcher controller 18 provides an offset hypothesis to PN generator 20. In the exemplary embodiment, the received signal is modulated by quadrature phase shift keying (QPSK), so PN generator provides a PN sequence for the I modulation component and a separate PN sequence for the Q modulation component to despreading element 6. Despreading element 6 multiplies the PN sequence with its corresponding modulation component and provides the two output component products to coherent accumulators 8 and 10.

Coherent accumulators 8 and 10 sum the product over the length of the product sequence. Coherent accumulators 8 and 10 are responsive to signals from searcher controller 18 for resetting, latching and setting the summation period. The sums of the products are provided from summers 8 and 10 to squaring means 12. Squaring means 12 squares each of the sums and adds the squares together.

The sum of the squares is provided by squaring means 12 to non-coherent combiner 14. Noncoherent combiner 14 determines an energy value from the output of squaring means 12. Noncoherent accumulator 14 serves to counteract the effects of a frequency discrepancy between the base station transmit clocks and the mobile station receive clock and aids in the detection statistic in a fading environment. If one knows that the frequency of the two clocks is exactly the same and that there are no deep fades then the ideal approach is to integrate the sequence over the entire accumulation period in the form:

$$E = \left( \sum_{n=1}^{N} I(n) PNI(n) \right)^2 + \left( \sum_{n=1}^{N} Q(n) PNQ(n) \right)^2 \tag{2}$$

, where $PNI(n)$ and $PNQ(n)$ can have values of $\pm 1$.

If, however, there is a probability of frequency mismatch or fading, then the correlator sacrifices some of its detection statistic in order to have a more robust correlation technique of the form:

$$E = \sum_{k=1}^{M} \left\{ \left( \sum_{n=1}^{N} I(n + (k-1)N) \cdot PNI(n + (k-1)N) \right)^2 + \left( \sum_{n=1}^{N} Q(n + (k-1)N) \cdot PNQ(n + (k-1)N) \right)^2 \right\} \tag{3}$$

Searcher controller 18 provides the value M to noncoherent accumulator 14.

Noncoherent accumulator 14 provides the energy signal to comparison means 16. Comparison means 16 compares the energy value to predetermined thresholds supplied by searcher controller means 18. The results of each of the comparisons is then fedback to searcher controller 18. Search controller 18 examines the comparisons and determines whether the window contains likely candidates for the correct offset. Then the widow is rescanned in accordance with the method of using a zoom window.

Figure 2:
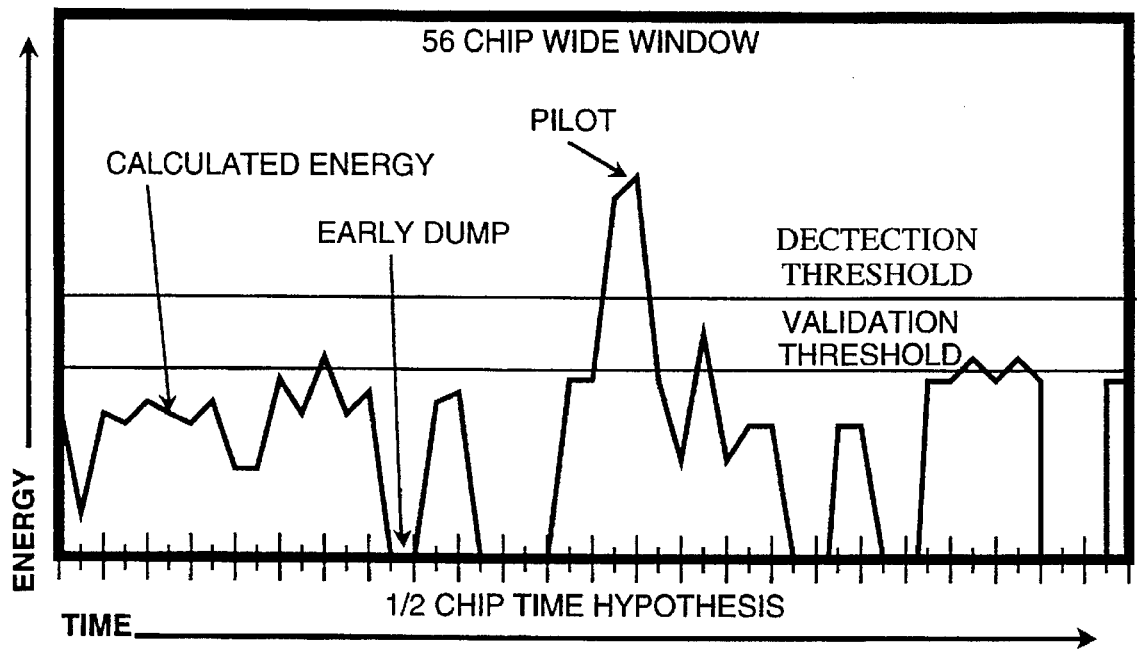
FIG. 2 is an illustration of the energy versus chip offset for a fixed window.

In order to illustrate the benefits of using the zoom window technique an example of the method using a fixed window size is provided. FIG. 2 illustrates a graph of the energy values versus the chip time hypothesis. In the exemplary embodiment a window contain 56 chip hypotheses. The window illustrates the use of a two level threshold test. The thresholds denoted are detection threshold and validation threshold.

Figure 3:
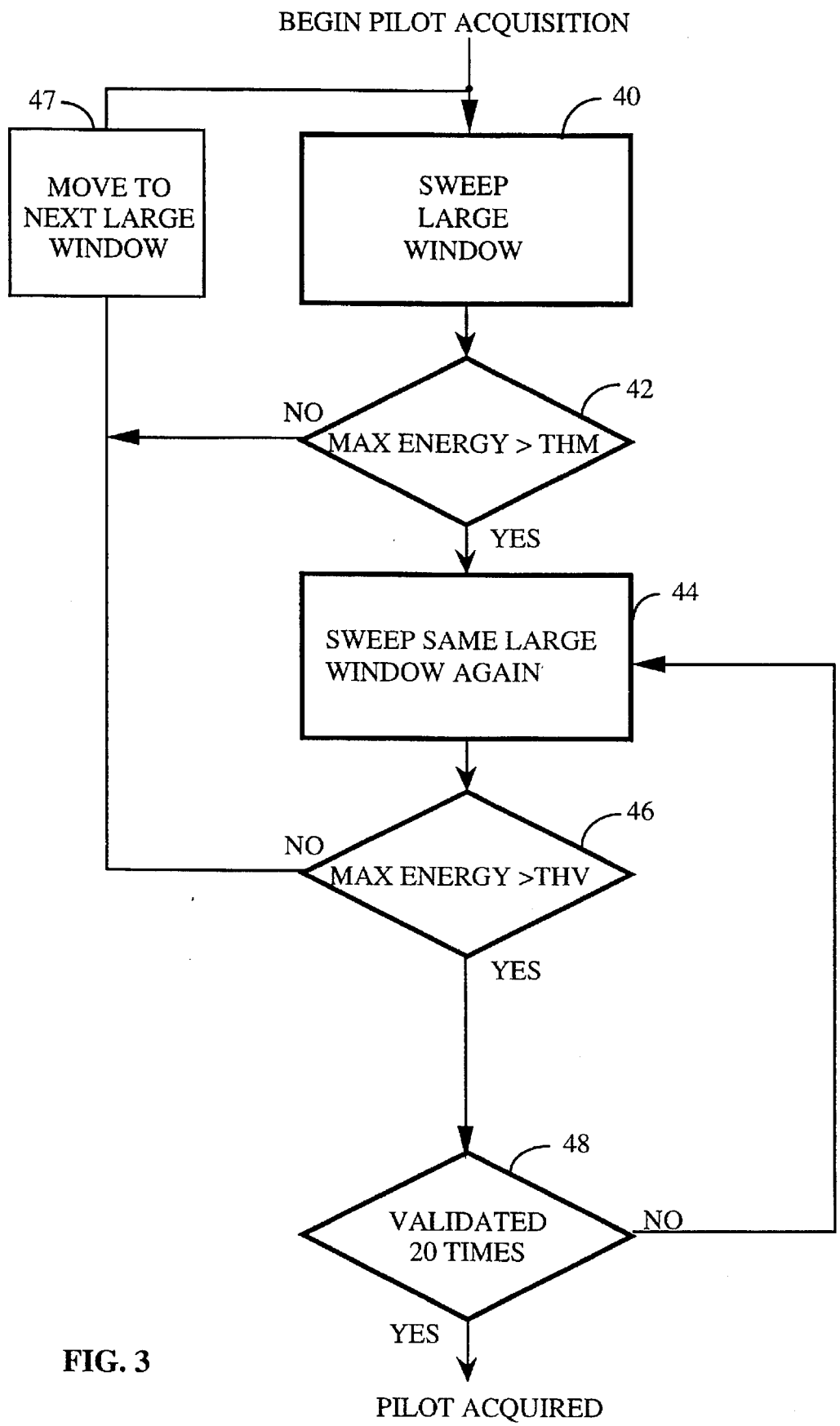
FIG. 3 is a flowchart illustrating a fixed window size implementation of the searcher algorithm.

FIG. 3 illustrates a conventional method used for scanning windows of a fixed number of hypotheses. The flow starts in block 40, where the operation described in relation to FIG. 1 is performed to give comparison results indicated in FIG. 2. If the window is "swept" and no hypothesis's energy exceeds the detection threshold (THM) block 42, then searcher controller 18 would begin sweeping the next window blocks 47 and block 40.

However, if there are points on the calculated energy curve which do exceed the detection threshold (THM), then the flow proceeds to the validation phase in block 44. In block 44, the same large window is swept again, and this time the calculated energy is compared against the lower threshold value, validation threshold (THV). If in block 46 the maximum energy detected does not exceed the validation threshold, then a next large window is swept in blocks 47 and 40. The flow proceeds to block 48 which determines if validation for N consecutive windows has occurred. If fewer than N validation tests, where for example N equals twenty, have been conducted then the flow proceeds to block 44 and the large window is swept again. However, after N consecutive successful validation tests, the pilot is determined to be acquired.

Figure 4:
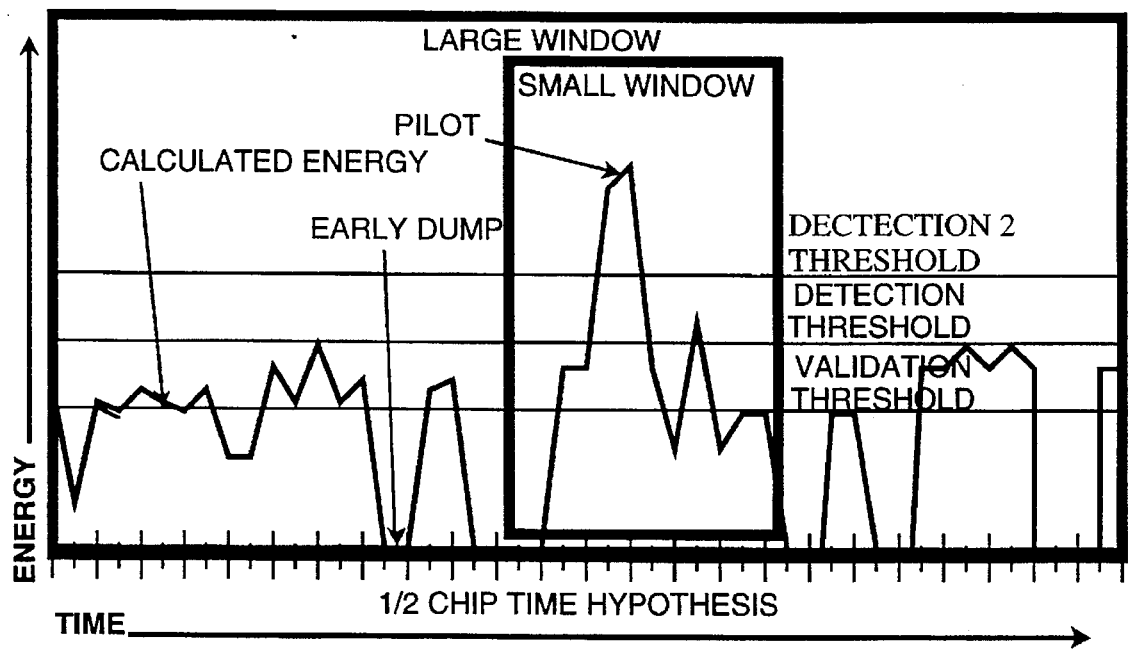
FIG. 4 is an illustration of the energy versus chip offset for the zoom window of the present invention.

Now turning to FIG. 4, the calculated energy curve is illustrated and the use of the zoom window of the present invention is illustrated. When a peak is detected, the searcher controller zooms in on that peak and tests hypotheses in a smaller set close to the hypothesis that gave rise to the detected peak.

Figure 5:
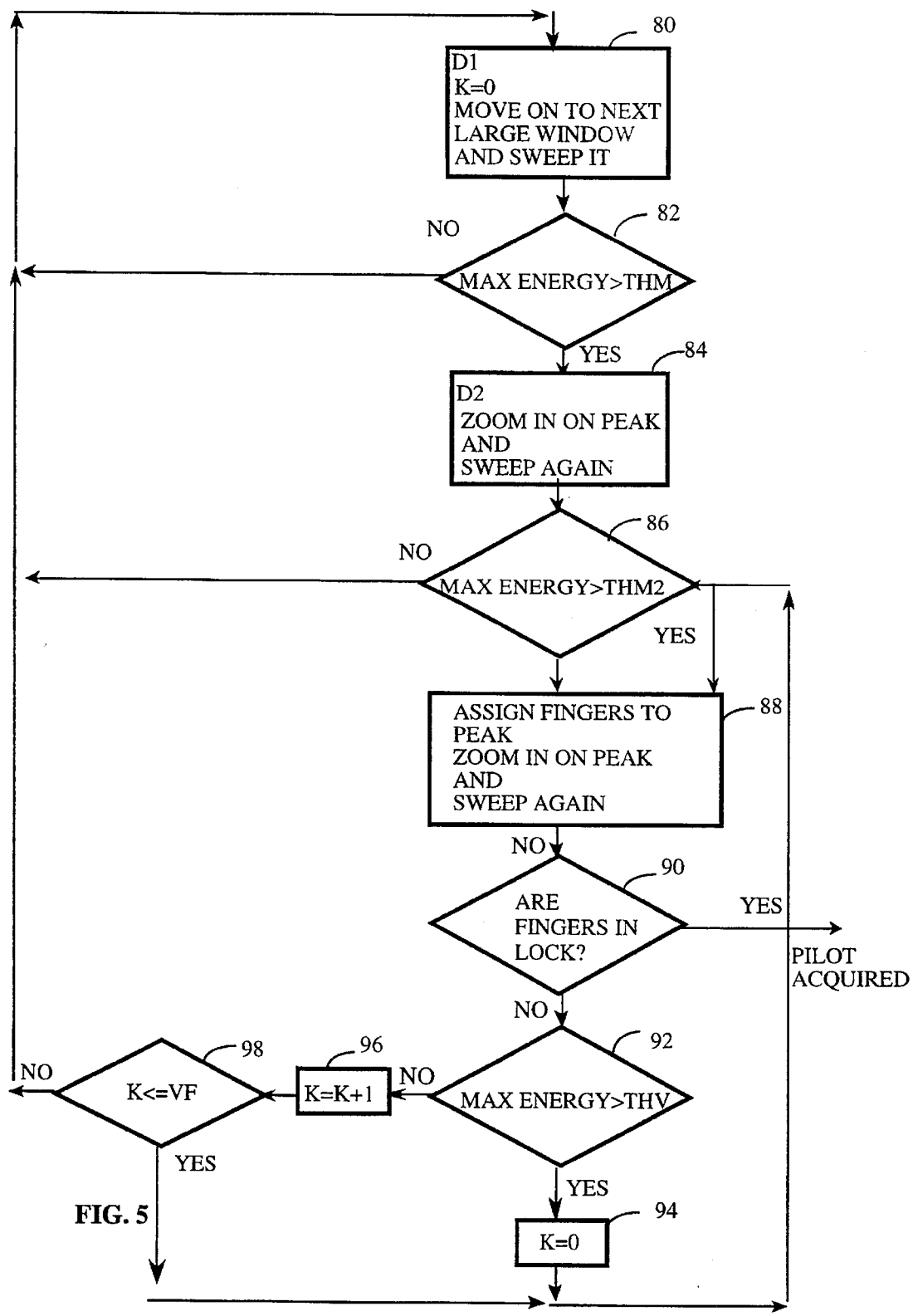
FIG. 5 is an illustration of the energy versus chip offset for the zoom window implementation of the present invention.

Turning to FIG. 5, a flowchart illustrates the method by which the searcher of the present invention operates. In the improved method of the present invention a three stage acquisition technique is used. In block 80, the large window is swept. Searcher controller 18 examines the comparison restfits to determine if there is a peak greater than Detection Threshold (THM). If no peak is detected greater than THM then the flow returns to block 80 and a new window is swept.

When a peak greater than THM is found in a large window, then the flow proceeds to block 84. This time only a sweep in the smaller set of hypotheses around the detected peak is performed. This smaller set of hypotheses is illustrated in FIG. 4 as the small window. The use of the small window for the second verification is to reduce the acquisition time by greatly reducing the time to test for false alarm, the state wherein the mobile initially believes it has narrowed in on the phase, but in reality has not. The time it takes to perform this second test is reduced proportionally to the ratio between the number of hypotheses in the small window versus the number of hypotheses in the large window. Noncoherent accumulations are performed on the data from this small window search in order to have a better operating characteristic.

Then in block 86, if there is energy greater than Detection threshold 2 (THM2), the search enters the validation phase. If no energy greater than the threshold THM2 is found then the flow returns to block 80 and a new large window is searched.

If in block 86, it is determined that there is a calculated energy value greater than threshold 2 (THM2), then the flow proceeds to block 88. There are three conditions under which validation is stopped: (1) the sweep fails $V_f$ in a row, (2) the frequency estimate doubles back on itself from on 100 ms sample to the next, or (3) determine that the pilot has been acquired. In validation, the signal at the peak is demodulated. In block 88, the received signal is demodulated in accordance with the hypothesis of the peak. The results of the demodulated signal are analyzed to determine if they are in lock, and if so then acquisition is complete. If the demodulated results indicate that the signal is not in lock, then the flow proceeds to block 92.

In block 92, the calculated energy values for the small window are compared to the validation threshold value (THV). If in block 92, there are calculated energy values in the small window which exceed the validation threshold then the flow proceeds to block 94 where a counter variable is set to zero and then the flow proceeds back to block 88 and the flow continues as previously described.

If in block 92, there are no calculated energy values in the small window which exceed the validation threshold then the flow proceeds to block 96 where a counter variable is incremented and then the flow proceeds back to block 98 which checks if the validation test has failed $V_f$ times in a row, where $V_f$ may be two. If the validation test has failed $V_f$ times in a row, then the flow proceeds to block 80 and a new large window is scanned. If the validation test has not failed $V_f$ times in a row, then the flow proceeds to block 88 and the operation continues as described previously.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. In a direct sequence spread spectrum receiver, a method for for processing a received signal, comprising the steps of;

calculating a first set of signal correlation energy values for said received signal despread according to a first set of PN sequences;

comparing said first set of signal correlation energy values against a first threshold value;

selecting a second set of PN sequences in accordance with said first set of signal correlation energy values;

calculating a second set of signal correlation energy values for said received signal despread according to said second set of PN sequences, wherein said second set of PN sequences is a subset of said first set of PN sequences; and selecting a synchronized PN sequence from said second set of PN sequences in accordance with said second set of signal correlation energy values; and demodulating said received signal in accordance with said selected synchronized PN sequence.

2. The method of claim 1 further comprising the step of comparing said second set of signal correlation energy values against a second threshold value.

3. The method of claim 1 further comprising the step of receiving and downconverting a broadcast signal to provide said received signal.

4. The method of claim 3 wherein said step of calculating said first set of signal correlation energy values comprises the steps of:

despreading said received signal in accordance with each PN sequence of said first set of PN sequences to provide a first set of despread signals; and calculating a signal correlation energy value for each of said despread signals.

5. The method of claim 3 wherein said step of calculating said second set of signal correlation energy values comprises the steps of:

despreading said received signal in accordance with each PN sequence of said second set of PN sequences to provide a second set of said spread signals; and calculating a signal correlation energy value for each despread signal of said second set of despread signals.

6. The method of claim 1 further comprising the step of generating said first set of PN sequences.

7. The method of claim 6 wherein said step of generating said first set of PN sequences, comprises the steps of:

providing a control signal; and generating a PN sequence of said first set of PN sequences in accordance with said control signal.

8. The method of claim 7 wherein said control signal is a temporal offset and said step of generating a PN sequence comprises outputting said PN sequence from a shift register in accordance with said temporal offset.

9. The method of claim 6 wherein said the step of generating said second set of PN sequences, comprises the steps of:

providing a control signal; and generating a PN sequence of said second set of PN sequences in accordance with said control signal.

10. The method of claim 9 wherein said control signal is a temporal offset and said step of generating said second set of PN sequences comprises outputting said PN sequences from a shift register in accordance with said temporal offset.

11. The method of claim 1 further comprising the step of generating said second set of PN sequences.

12. The method of claim 1 wherein said first set of PN sequences comprise sets of quadrature $PN_I$ and $PN_Q$ sequences.

13. The method of claim 12 wherein said step of calculating said first set of signal correlation energy values comprises the steps of:

despreading an I component of said received signal and a Q component of said received signal by said $PN_I$ and $PN_Q$ sequences to provide corresponding despread I and Q components of said received signal;

coherently accumulating said despread I components of said received signal to provide an accumulated I component;

coherently accumulating said despread Q components of said received signal to provide an accumulated Q component;

squaring each of said accumulated I component and said accumulated Q component and summing said squares of said accumulated I component and said accumulated Q component; and noncoherently combining said sum of said squares of said accumulated I component and said accumulated Q component.

14. The method of claim 1 wherein said second set of PN sequences comprise sets of quadrature $PN_I$ and $PN_Q$ sequences.

15. The method of claim 14 wherein said step of calculating said second set of signal correlation energy values comprises the steps:

despreading an I component of said received signal and a Q component of said received signal by said $PN_I$ and $PN_Q$ sequences to provide corresponding despread I and Q components of said received signal;

coherently accumulating said despread I components of said received signal to provide an accumulated I component;

coherently accumulating said despread Q components of said received signal to provide an accumulated Q component;

squaring each of said accumulated I component and said accumulated Q component and summing said squares of said accumulated I component and said accumulated Q component; and noncoherently combining said sum of said squares of said accumulated I component and said accumulated Q component.

16. The method of claim 1 wherein said received signal is a pilot signal.

17. An apparatus for selecting a synchronized demodulation sequence comprising:

sequence generator means for receiving a first control signal for providing a plurality of demodulation sequences in response to said first control signal;

demodulator means for receiving a received signal and demodulating a received signal in accordance with said plurality of demodulation sequences to provide a plurality of despread signals;

correlator means for receiving said plurality of despread signals and calculating signal correlation energy values for said plurality of despread signals;

searcher controller means for receiving said signal correlation energy values and for providing said first control signal and for providing a second control signal in accordance with said signal correlation energy values; and wherein said sequence generator means is further for receiving said second control signal and for providing a second plurality of demodulation sequences in response to said second control signal and wherein said second plurality of demodulation sequences are a subset of said first plurality of demodulation sequences.

18. The apparatus of claim 17 wherein said correlator means comprises accumulator means for receiving said plurality of despread signals and for summing the despread signals over a predetermined length.

19. The apparatus of claim 17 wherein said received signal comprises a first received signal component and a second received signal component and wherein said demodulator means is for receiving said first received signal component and said second received signal component and for demodulating said first received signal component in accordance with a first plurality of demodulation sequences to provide a first plurality of despread signals and for demodulating said second received signal component in accordance with a second plurality of demodulation sequences to provide a second plurality of despread signals and wherein said sequence generator means is for generating said first plurality of demodulation sequences and said second plurality of demodulation sequences.

20. The apparatus of claim 19 wherein said correlator means comprises:

first accumulator means for receiving said first plurality of despread signals and for summing each of said first plurality of despread signals over a predetermined length to provide a first plurality of despread sum values;

second accumulator means for receiving said second plurality of despread signals and for summing each of said second plurality of despread signals over a predetermined length to provide a second plurality of despread sum values;

combiner means for receiving said first plurality of despread sum values and for receiving said second plurality of despread sum values and for combining said first plurality of despread sum values and said second plurality of despread sum values to provide said signal correlation energy values.

21. The apparatus of claim 20 wherein said combiner means comprises:

squaring means for receiving said first plurality of despread sum values and for receiving said second plurality of despread sum values and for squaring each of said first plurality of despread sum values and each of said second plurality of despread sum values and adding each of said first plurality of squared despread sum values to a corresponding one of said second plurality of squared despread sum values to provide a plurality of energy magnitude values; and noncoherent combiner for receiving said plurality of energy magnitude values and computing said signal correlation energy values in accordance with said plurality of energy magnitude values.

22. The apparatus of claim 21 wherein said searcher controller means is further for providing a combination signal and wherein said noncoherent combiner is responsive to said combination signal.

23. A system for selecting a synchronized demodulation sequence comprising:

a sequence generator having an input for receiving a first control signal and having an output;

a demodulator having an input coupled to said sequence generator output and having an output;

an energy calculator having an input coupled to said demodulator output and having an output; and a searcher controller having an input coupled to said energy calculator output.

24. The system of claim 23 wherein said energy calculator comprises a coherent accumulator.

25. The system of claim 23 wherein said sequence generator has a second output and wherein said demodulator has a second input coupled to said sequence generator second output.

26. The system of claim 23 wherein said demodulator has a second output and wherein said energy calculator comprises:

a first coherent accumulator having an input coupled to said demodulator output and having an output;

a second coherent accumulator having an input coupled to said second demodulator output and having an output;

a sum of the squares calculator having a first input coupled to said first coherent accumulator output and having a second input coupled to said second coherent accumulator output and having an output;

a noncoherent accumulator having an input coupled to said sum of the squares calculator output.

27. The system of claim 23 further comprising a threshold comparator having an input coupled to said energy calculator output and having an output.

* * * * *